United States Patent [19]

Hayashi et al.

[11] Patent Number: 6,115,803
[45] Date of Patent: Sep. 5, 2000

[54] PARALLEL COMPUTER WHICH VERIFIES DIRECT DATA TRANSMISSION BETWEEN LOCAL MEMORIES WITH A SEND COMPLETE FLAG

[75] Inventors: Kenichi Hayashi; Yoichi Koyanagi; Takeshi Horie; Osamu Shiraki, all of Kawasaki, Japan

[73] Assignee: Fujitsu Limited, Kawasaki, Japan

[21] Appl. No.: 09/010,627

[22] Filed: Jan. 22, 1998

Related U.S. Application Data

[63] Continuation of application No. 08/408,306, Mar. 22, 1995, abandoned.

[30] Foreign Application Priority Data

May 17, 1994 [JP] Japan ........................................ 6-10269

[51] Int. Cl.[7] .............................. G06F 9/345; G06F 9/38
[52] U.S. Cl. ............................ 712/25; 712/41; 709/206; 709/242
[58] Field of Search ..................................... 709/209, 300, 709/206, 242, 43, 208; 712/28, 241, 34, 23, 27, 25, 41, 42, 206, 20; 379/95.02, 207; 710/22, 260, 6, 200, 130, 1, 267; 714/6; 711/121, 145, 141, 143, 147

[56] References Cited

U.S. PATENT DOCUMENTS

| | | | |
|---|---|---|---|
| 4,402,046 | 8/1983 | Cox et al. ................................. | 709/213 |
| 5,023,798 | 6/1991 | Simon, Jr. et al. ......................... | 99/200 |
| 5,202,998 | 4/1993 | Yanes ....................................... | 710/267 |
| 5,386,566 | 1/1995 | Hamanaka et al. ...................... | 709/300 |
| 5,388,226 | 2/1995 | Gutierrez et al. ........................ | 710/130 |
| 5,437,048 | 7/1995 | Morita et al. ............................ | 709/208 |
| 5,463,765 | 10/1995 | Kakula et al. ................................ | 714/6 |
| 5,465,368 | 11/1995 | Davidson et al. ......................... | 712/27 |

FOREIGN PATENT DOCUMENTS 7-311750  11/1995  Japan .

Primary Examiner—Daniel H. Pan
Attorney, Agent, or Firm—Staas & Halsey

[57] ABSTRACT

A parallel computer including a plurality of processing elements, each of processing elements comprising a flag address holding unit for temporarily holding an address of a send complete flag of a direct remote write message when the direct remote write message is sent to another processing element, and a flag update unit for exclusively updating a flag represented by the address held in the flag address holding unit when data indicated by the direct remote write message has been sent.

18 Claims, 10 Drawing Sheets put(dest_cid, local_addr, size, remote_addr, send_complete_flag, put_flag, ack)

Fig. 3(a)

get(dest_cid, local_addr, size, remote_addr, get_flag, send_complete_flag)

Fig. 3(b)

PARALLEL COMPUTER WHICH VERIFIES DIRECT DATA TRANSMISSION BETWEEN LOCAL MEMORIES WITH A SEND COMPLETE FLAG

This is a continuation of Ser. No. 08/408,306 filed on Mar. 22, 1995, now abandoned.

BACKGROUND OF THE INVENTION

1. Field of the Invention

The present invention relates to a parallel computer comprising a plurality of processing elements, in particular, to a parallel computer for reducing overhead of software so as to improve efficiency of data processing.

2. Description of the Related Art

When a parallel computer that performs communication by message passing executes a global operation, it treats data used in the global operation as messages. In other words, each processing element of the parallel computer sends data necessary for a global operation to a buffer of a designated receiver processing element in the same manner as a conventional message. Then the receiver processing element searches a buffer by software and copies the data to a user memory region to receive the message data. In this case, a conventional memory is used for the buffer. Since it is necessary to search the buffer and copy a message from the buffer, overhead of software is large.

To solve such a problem, a method for using active messages such as PUT/GET is known.

When a processing element uses a PUT message, data can be directly transferred from a user region of the processing element(sender) to a user region of another processing element(receiver) without using a buffer. When a processing element uses a GET message, data can be directly transferred from the user region of another processing element (sender) to the user region of the processing unit(receiver) without using the buffer.

Thus, the overhead involved in the receiving process of message passing can be deleted. In addition, the communication and calculation can be overlapped. However, in the case of PUT/GET, unlike with the message passing, there is no explicit receive command, therefore means for detecting the reception of a message is required.

Thus, to implement the PUT/GET in a conventional parallel computer, when the computer receives a message, it activates a software handler using an interrupt so as to exclusively update a flag that represents the reception of the message in a system mode or the like to detect the reception of the message.

However, in the above described configuration, overhead of the software is large.

SUMMARY OF THE INVENTION

An object of the present invention is to provide a parallel computer that uses messages such as PUT/GET for direct data transmission from a local memory to another local memory with reduced software overhead.

The parallel computer according to the present invention comprises a plurality of processing elements. Each processing element comprises a flag address holding unit and a flag update unit.

When a processing element 1 (PE1) sends a direct remote write message to another processing element 2 (PE2), the flag address holding unit of PE1 temporarily holds the address of a send complete flag included in the message. When data indicated by the direct remote write message has been sent, the flag update unit of PE1 exclusively updates a flag indicated by the address of the send complete flag held in the flag address holding unit to represent that the data has been sent.

When PE1 receives a direct remote write message from PE2, the flag address holding unit of PE1 temporarily holds the address of a receive complete flag contained in the message. When data indicated by the direct remote write message has been received, the flag update unit of PE1 exclusively updates a flag indicated by the address of the receive complete flag held in the flag address holding unit to represent that the data has been received.

When PE1 had sent a direct remote read message to PE2 and PE1 has completed receiving reply data in response to the message from PE2, PE1 exclusively updates a flag indicated by the address of an acquisition complete flag included in the direct remote read message to represent that the data acquisition has been completed.

When PE1 receives a direct remote read message from PE2, the flag address holding unit of PE1 temporarily holds the address of a reply complete flag of the message. When PE1 has completed sending data indicated by the direct remote read message, the flag update unit of PE1 exclusively updates a flag indicated by the address of the reply complete flag held in the flag address holding unit to represent that the data has been replied.

In a second aspect of the parallel computer according to the present invention, each processing element comprises a dedicated communication register. The dedicated communication register comprises a plurality of registers and a plurality of flags corresponding thereto. Each of the registers stores data indicated by a direct remote write message received from another processing element. Each of the flags represents data storage state of the corresponding register. Each processing element references data stored in the dedicated communication register so as to reference data of the other process element and performs data processing.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 3a, b are a schematic diagrams for explaining basic formats of PUT/GET;

DESCRIPTION OF PREFERRED EMBODIMENTS

Figure 1:
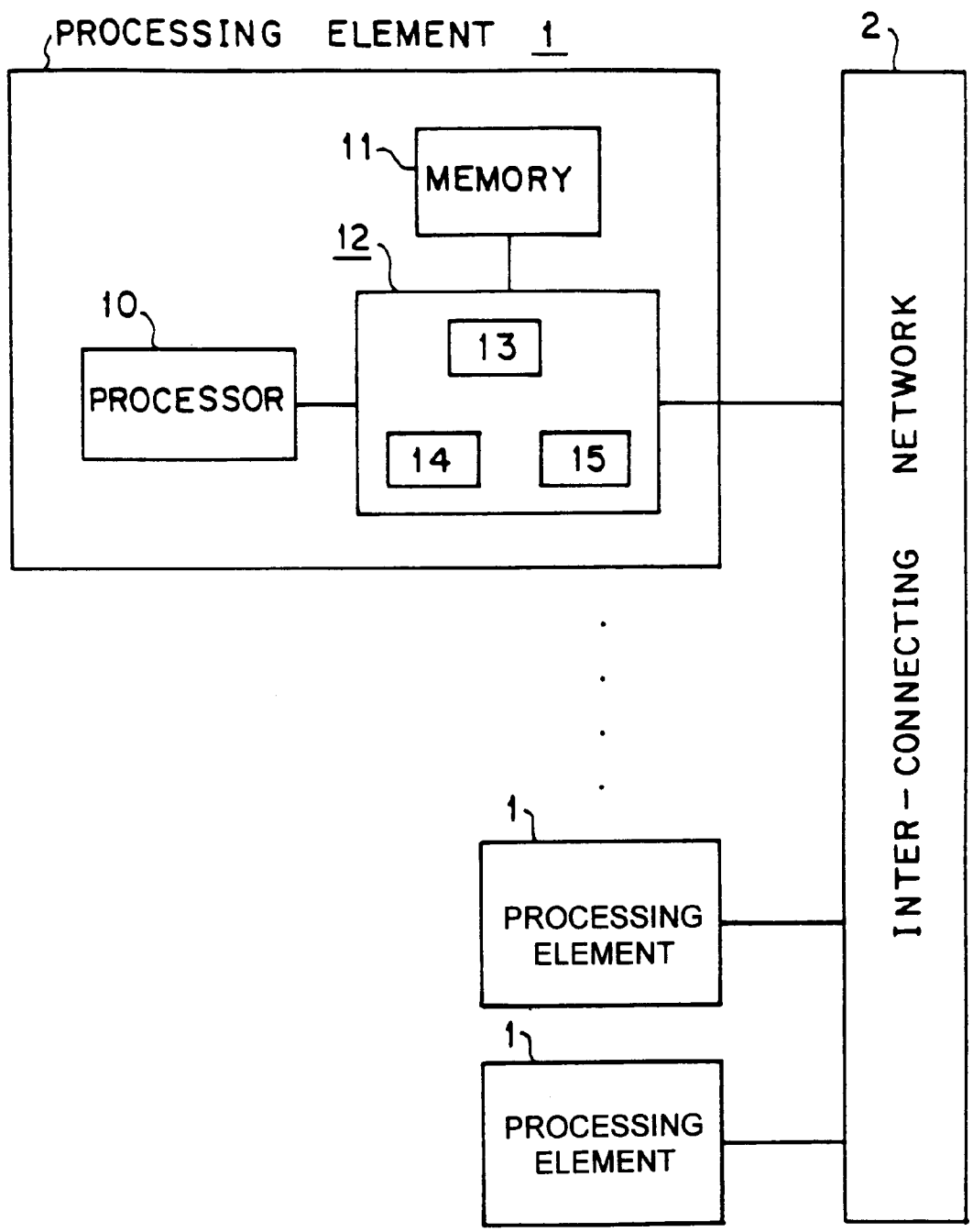
FIG. 1 is a schematic diagram showing a theoretical construction of the present invention.
Figure 2:
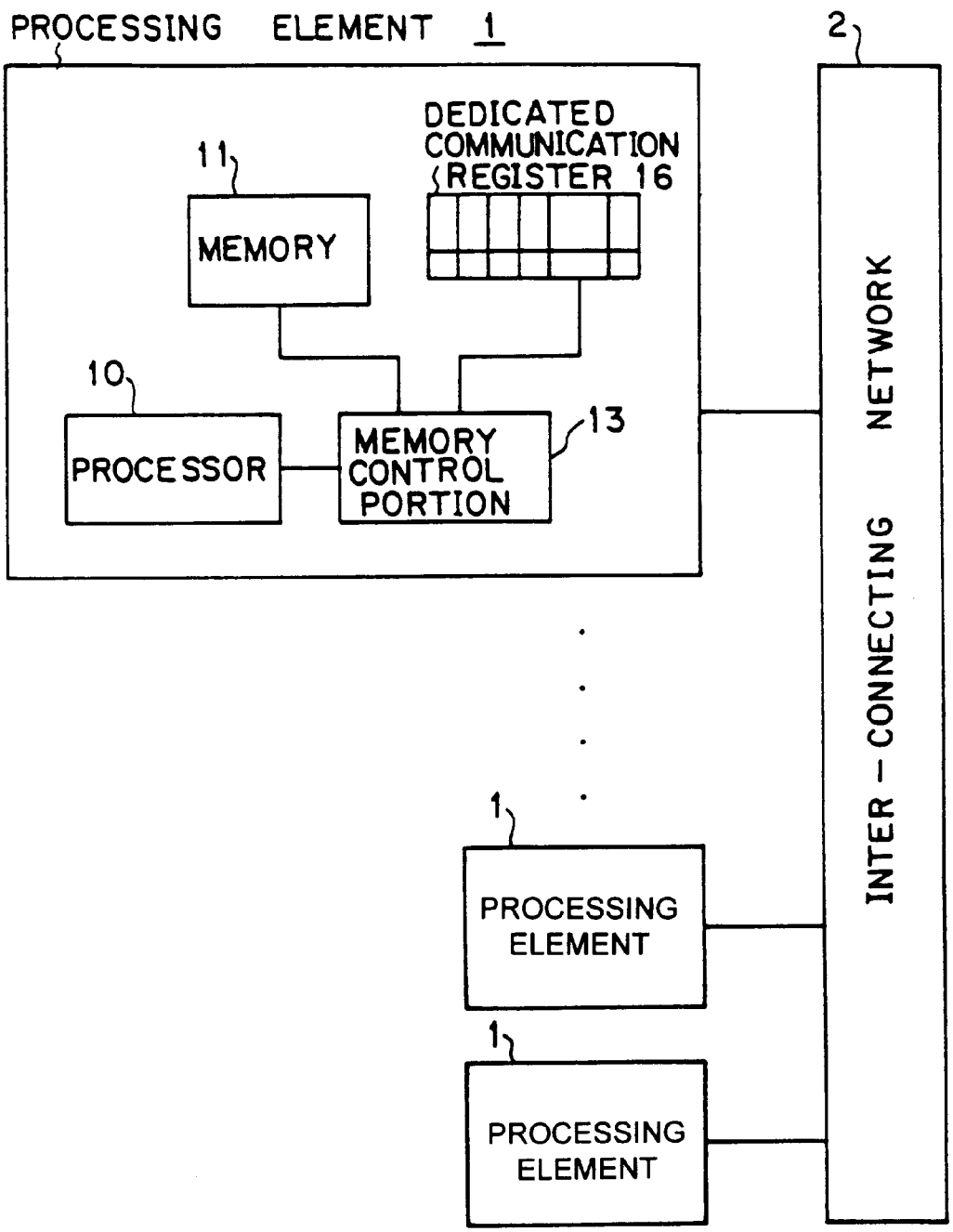
FIG. 2 is a schematic diagram showing a theoretical construction of the present invention.

FIGS. 1 and 2 show theoretical constructions of the present invention. In these drawings. a plurality of processing elements 1 construct a parallel computer. An interconnecting network 2 connects each processing element 1.

Each processing element 1 shown in FIG. 1 comprises a processor 10, a memory 11, and a communication control unit 12.

The communication control unit 12 comprises a memory control unit 13, a flag address holding unit 14, and a flag update unit 15. The memory control unit 13 controls the memory 11. The flag address holding unit 14 temporarily holds the address of a flag included in the header of direct remote write/read messages that are sent/received to and from another processing element 1. The flag update unit 15 exclusively updates a flag indicated by the flag address held in the flag address holding unit 14.

It is a feature of the present invention shown, in FIG. 1 that the communication control unit 12, which is constructed of hardware, comprises the flag address holding unit 14 and the flag update unit 15.

When the processor 10 of a processing element 1(sender) sends a direct remote write message such as PUT to another processing element 1(receiver) (the direct remote write message causes data to be written into a memory or a register of the receiver), the flag address holding unit 14 temporarily holds the address of a send complete flag contained in the header of the direct remote write message. When data indicated by the direct remote write message has been sent, the flag update unit 15 exclusively updates a flag indicated by the address of the send complete flag held in the flag address holding unit 14 so as to set a flag that represents that data indicated by the direct remote write message has been sent.

At this point, the flag address holding unit 14 also holds the address of an acknowledgement flag. When the processing element 1(sender) sends the direct remote write message to another processing element 1(receiver), the flag update unit 15 updates the acknowledgement flag. In addition, when the sender receives a receive complete message from the receiver in response to the direct remote write message, the flag update unit 15 updates the acknowledgement flag in inverse mode so as to set a flag that represents that the receiver has received the data indicated by the direct remote write message.

When a processing element 1(receiver) receives a direct remote write message such as PUT from another processing element 1(sender), the flag address holding unit 14 of the receiver temporarily holds the address of a receive complete flag contained in the header of the direct remote write message. When the receiver has received data indicated by the direct remote write message, the flag update unit 15 exclusively updates a flag indicated by the address of the receive complete flag held the flag address holding unit 14 so as to set a flag that represents that the receiver has received the data indicated by the direct remote write message.

In addition, when a processing element 1 has received reply data in response to a direct remote read message such as GET (the direct remote read message causes data to be read directly from a memory or a register of another processing element), the flag update unit 15 exclusively updates a flag indicated by the address of the acquisition complete flag contained in the header of the direct remote read message so as to set a flag that represents the processing element 1 has acquired the data indicated by the direct remote read message.

When a processing element 1(sender) receives a direct remote read message such as GET from another processing element 1(receiver), the flag address holding unit 14 temporarily holds the address of a reply complete flag contained in the header of the direct remote read message. When the sender has sent the data indicated by the direct remote read message (GET), the flag update unit 15 exclusively updates a flag indicated by the address of the reply complete flag held in the flag address holding unit 14 so as to set a flag that represents that the sender has replied the data indicated by the direct remote read message.

According to the present invention shown in FIG. 1, when messages such as PUT/GET that directly access a memory are used, a flag that is used to protect send/receive regions for sending and receiving messages is updated by hardware. Thus, unlike with the conventional system, the operation of the processor 10 is not affected by an interrupt. Consequently, by combining with a system that sends a request of PUT/GET without blocking the processor 10, communication and calculation of data can be completely overlapped, thereby remarkably improving the executing efficiency of the parallel computer.

In FIG. 2, the processing element 1 comprises a processor 10, a memory 11, a memory control unit 13, and a dedicated communication register 16.

The dedicated communication register 16 comprises a plurality of registers and a plurality of flags corresponding thereto. Each register stores data indicated by a direct remote write message received from another processing element 1. Each flag manages a bit value representing data storage state of the corresponding register.

It is a feature of the present invention shown in FIG. 2 that the processing element 1 comprises the dedicated communication register 16, which comprises the registers (which store data indicated by the direct remote write message such as PUT received from another processing element 1) and the flags (which manage bit values representing data storage states of the corresponding registers).

In such a construction, the processing element 1 performs operations for both data stored in the dedicated communication register 16 and local data and sends the calculated resultant data to the dedicated communication register of another processing element 1 using the direct remote write message so as to execute a global operation.

In addition, a processor element 1 can send broadcast data to the dedicated communication register 16 of another processing element 1 using the direct remote write message, to execute a broadcast process.

Moreover, a processing element 1 can perform an operation for both data stored in the dedicated communication register 16 and local data and send the calculated resultant data to the dedicated communication register 16 of another processing element 1 using the direct remote write message to perform a barrier synchronizing process.

In addition, a processing element 1 can perform a predetermined operation for data stored in the dedicated communication register 16 and send the calculated resultant data to the dedicated communication register 16 of another processing element 1 using the direct remote write message to perform a recognizing process of the status of barrier synchronization.

Thus, according to the present invention shown in FIG. 2, when a message such as PUT that directly accesses the memory is used, the dedicated communication register 16 is used as the destination of data indicated by the message, thereby remarkably reducing the overhead for accessing the memory. In addition, since the data receive state in the dedicated communication register 16 is represented with a flag, the access of the processor 10 to the dedicated communication register 16 can be controlled by hardware using the flag. Thus, the overhead of the software can be deleted. Consequently, the global operation process, the broadcast process, the barrier synchronizing process can be executed at higher speed.

Next, preferred embodiments of the present invention will be described in detail.

In the parallel computer according to the present invention, messages (such as PUT and GET) that causes data to be read and written from and to the memory or register of another processing element 1 are used.

FIGS. 3(a) and 3(b) show basic formats of PUT and GET used in the present invention, respectively.

As shown in FIG. 3(a), PUT used in the present invention has arguments of dest_cid (the ID of a processing element 1 (receiver) to which data will be sent), local_addr (the address of the local memory of the processing element 1(sender) where send data is stored), size (the size of data to be sent), remote_addr (the address of the local memory of the receiver to which data will be sent), send_complete_flag (the address of the send complete flag that informs the software of the sender that data has been sent), put_flag (the address of the put flag that informs the software of the receiver that data has been received), and ack (the value which direct that ack flag, which informs the software of the sender that the data has been received, is used or not).

When a processing element 1 (sender) sends data to another processing element 1 (receiver) using PUT, the processor 10 sets the ID of the receiver to dest_cid. The address of the local memory of the data to be sent is set to local_addr. The size of data to be sent is set to size. The address of the local memory of the receiver is set to remote_addr. The address of the send complete flag is set to send_complete_flag. The address of the put flag is set to put_flag. When the act flag is enabled, "1" is set to ack. When the act flag is disabled, "0" is set to ack.

On the other hand, GET used in the present invention has arguments of dest_cid (the ID of a processing element 1 (sender) from which data is received), local_addr (the address of the local memory of the processing element 1 (receiver) to which required data will be stored), size (the size of required data), remote_addr (the address of the local memory of the sender in which required data is stored), get_flag (the address of get flag that informs the software of the receiver that the data has been acquired), and send_complete_flag (the address of send complete flag that informs the software of the sender that data has been replied).

In other words, when a processing element 1 (receiver) acquires data from another processing element 1 (sender) using GET, the processor 10 sets the ID of the sender from which data is received to dest_cid. The address of the local memory to which required data will be stored is set to local_addr. The size of the required data is set to size. The address of the local memory to which the required data is stored is set to remote_addr. The address of the get flag is set to get_flag. The address of the send compete flag is set to send_complete_flag.

Figure 4:
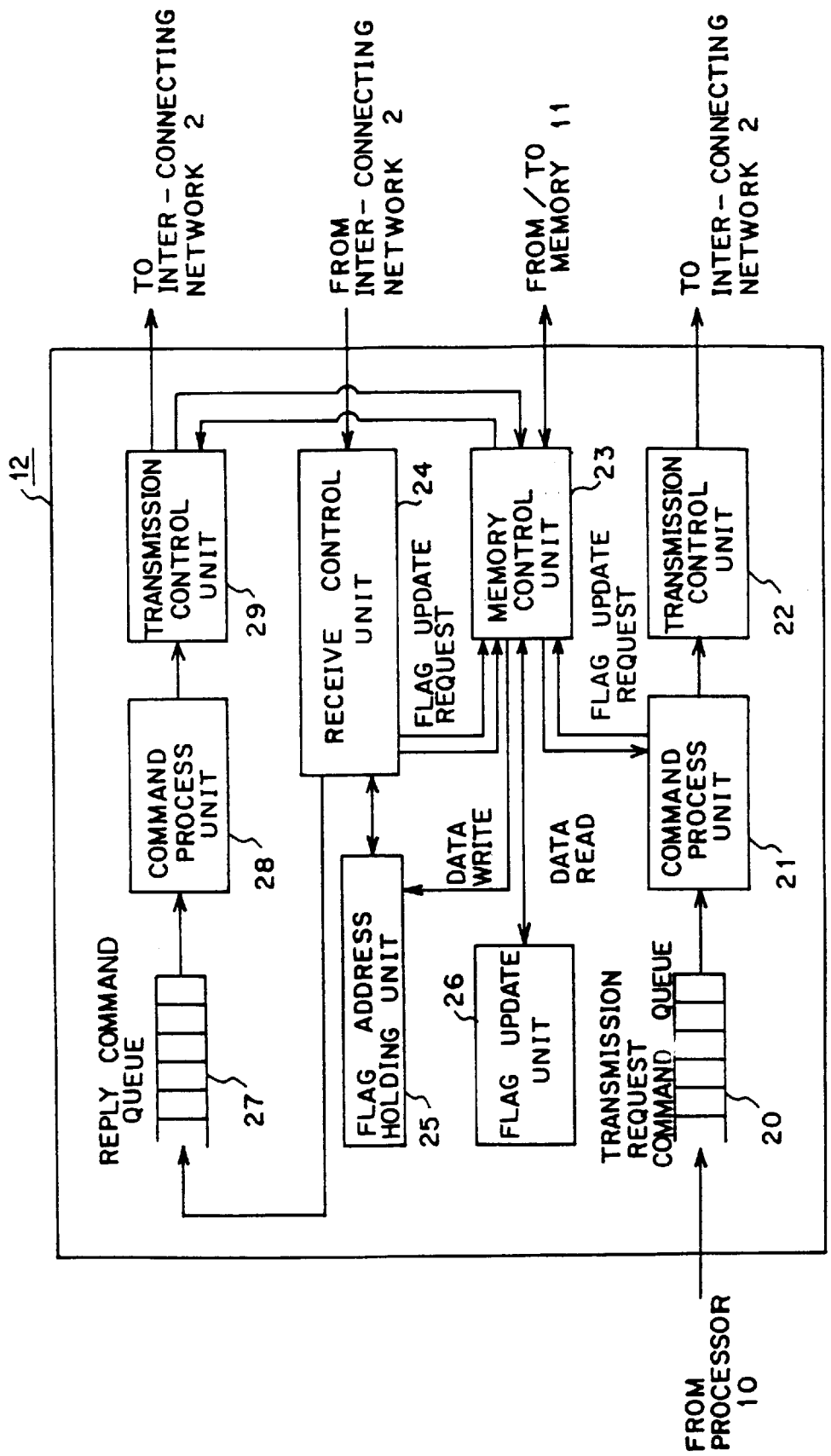
FIG. 4 is a block diagram showing an embodiment of the present invention.

FIG. 4 shows an embodiment of the communication control unit 12 shown in FIG. 1. Next, referring to FIG. 4, the construction of the communication control unit 12 will be described in detail.

In FIG. 4, a transmission request command queue 20 queues PUT and GET requested by the processor 10. A command process unit 21 that interprets a transmission request queued in the transmission request command queue 20 and issues a data transmission request. A transmission control unit 22 executes a data transmission process corresponding to a data transmission request issued by the command process unit 21.

A memory control unit 23 has a DMA (Direct Memory Access) function so as to read and write data from and to the memory 11. A receive control unit 24 receives data from another processing element 1. A flag address holding unit 25 that temporarily holds the addresses of flags that PUT and GET have. A flag update unit 26 that exclusively updates a flag indicated by the flag address held in the flag address holding unit 25.

A reply command queue 27 queues GET received from another processing element 1. A command process unit 28 interprets GET queued in the reply command queue 27 and issues a data transmission request. A transmission control unit 29 that executes a data transmission process corresponding to a data transmission request issued by the command process unit 28.

Next, with reference to flow charts of FIGS. 5 to 7, the operation of the communication control unit 12 will be described.

When the command process unit 21 of the processing element 1 sends data designated by PUT in response to a read transmission request that is read from the transmission request command queue 20, the command process unit 21 of the processing element 1 direct the memory control unit 23 to read data of the seize designated by PUT starting from the address local_addr designated by PUT. Thereafter, the command process unit 21 direct the transmission control unit 22 to transmit the read data to the receiver processing element 1 along with PUT.

When this process is started, the command process unit 21 informs the memory control unit 23 of the address of the send complete flag and the ack value designated by PUT and direct it to perform a flag update process for the send complete flag and ack flag. When the memory control unit 23 receives the update request, it stores the address of the send complete flag to the flag address holding unit 25. When the ack flag is enabled, the memory control unit 23 informs the flag update unit that the ack flag is enabled.

When the flag update unit 26 is informed that the ack flag is enabled, it exclusively obtains the value pointed to by the address of the ack flag held in the flag address holding unit 25 and increments the value of the flag by "1". Since the ack flag is provided as a common flag in each processing element, the address of the ack flag is pre-held in the flag address holding unit 25.

Thereafter, the memory control unit 23 reads the required data from the memory 11 and sends it to the command process unit 21. Thus, the data is sent to a receiver processing element 1 designated by PUT. When the receiver processing element 1 has read all data to be sent, the memory control unit 23 inform the flag update unit 26 of the completion of the data read process.

When the flag update unit 26 is informed of the completion of data transmission, the flag update unit 26 exclusively obtains the flag value pointed to by the address of the send complete flag held in the flag address holding unit 25, that is the flag value of the send complete flag, and increments the flag value by "1". When the flag update unit 26 receives a receive complete message from the receiver processing element 1 in response to the data transmission, if the ack value represents that the ack flag is enabled, the flag update unit 26 exclusively obtains the flag value pointed to by the address of the ack flag held in the flag address holding unit 25, that is the flag value of the ack flag, and decrements the flag value by "1".

Figure 5:
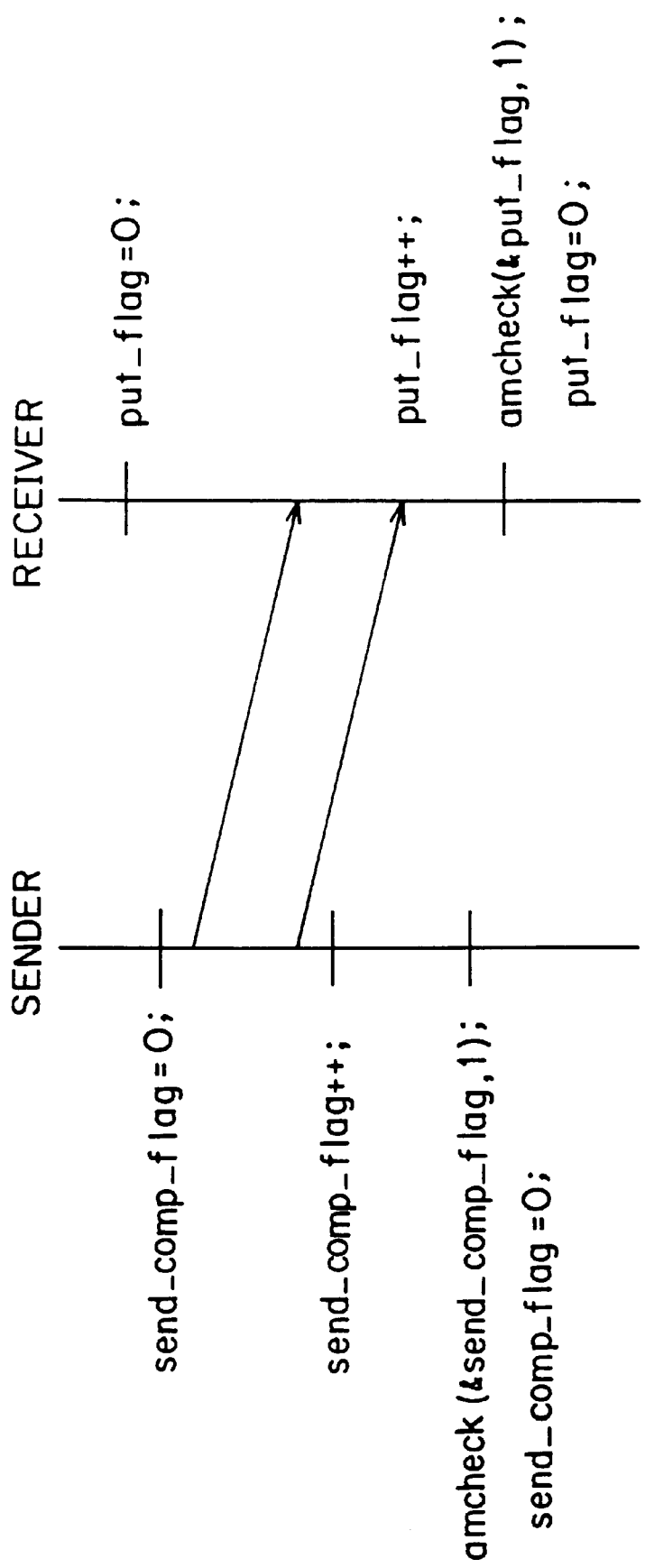
FIG. 5 is a time chart showing a process in issuing PUT.
Figure 6:
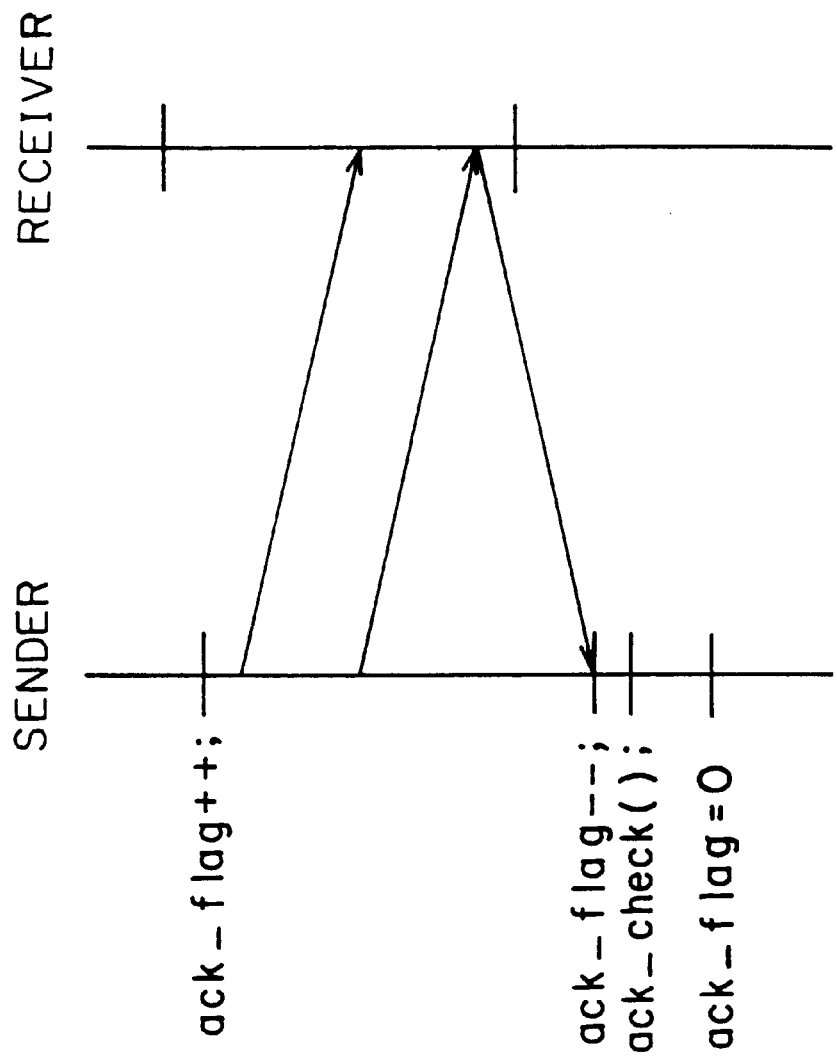
FIG. 6 is a time chart showing a process in issuing PUT.

As shown in FIG. 5, when the sender processing element 1 has sent data designated by PUT, the flag value of the send complete flag is changed to "1". When a function amcheck detects that the flag value becomes "1", the software that issued the PUT is notified of the completion of the data transmission. As shown in FIG. 6, when the sender processing element 1 starts sending data designated by PUT, the flag value of the ack flag is set to "1". When the sender processing element 1 receives a receives complete message which represents that the receiver processing element 1 has received the data, the flag value of ack flag is set to "0".

When a function ack_check( ) detects that the flag value of the ack flag is "0", the software that issued the PUT is notified of the completion of the data reception by the processing element 1.

Thus, according to the present invention, the sending region of the memory can be protected without using an interrupt. In the embodiment shown in FIG. 5, when the function amcheck detect that the flag value of the send complete flag is changed to "1", the software is notified of the completion of the data transmission. However, when the flag value of the send complete flag becomes a value other than "1", the software may be notified of the completion of the data transmission.

When a processing element 1 receives data designated by PUT, the receive control unit 24 thereof directs the memory control unit 23 to write received data of the seize designated by PUT to a region of the memory 11 starting from the address remote-addr designated by PUT.

When this process is started, the receive control unit 24 informs the memory control unit 23 of the address of the put flag designated by PUT and directs it to update the put flag. When the memory control unit 23 receives the update request, it makes the flag address holding unit 25 hold the address of the put flag.

Thereafter, the memory control unit 23 writes the received data to the memory 11. When the memory control unit 23 has completed the data write process, it informs the flag update unit 26 of the completion of the data reception When the flag update unit 26 is informed of the completion, it exclusively obtains the flag value pointed to by the address of the put flag held in the flag address holding unit 25, that is the flag value of the put flag, and increments the flag value by "1".

When the receiver processing element 1 has received data designated by PUT, the flag value of the put flag is changed to "1". The software of the receiver processing element 1 is notified of the completion of the data reception when a function amcheck detects that the flag value is "1".

Thus, according to the present invention, the receiving region of the memory can be protected without using an interrupt. In the embodiment shown in FIG. 5, when the function amcheck detects that the flag value of the put flag is changed to "1", the software is notified of the completion of the data reception. However, when the flag value of the put flag is changed to a value other than "11", the software may be notified of the completion of the data reception.

When a receiver processing element 1 sends GET corresponding to a transmission request read from the transmission request command queue 20, the command process unit 21 directs the transmission control unit 22 to send GET to a sender processing element 1 from which data is received.

When the receiver processing element 1 receives information with respect to the issued GET and the required data from the sender processing element 1, the receive control unit 24 of the receiver processing element directs the memory control unit 23 to write required data of the size designated by GET to a region of the memory 11 starting from the address local_addr designated by GET.

When the memory control unit 23 has completed the write process for the required data, it sends the address of the get flag designated by GET to the flag update unit 26 and informs it of the completion of the required data reception. When the flag update unit 26 is informed of the completion, it exclusively obtains the flag value pointed to by the address of the get flag, that is the flag value of the get flag, and increments the flag vale by "1".

Figure 7:
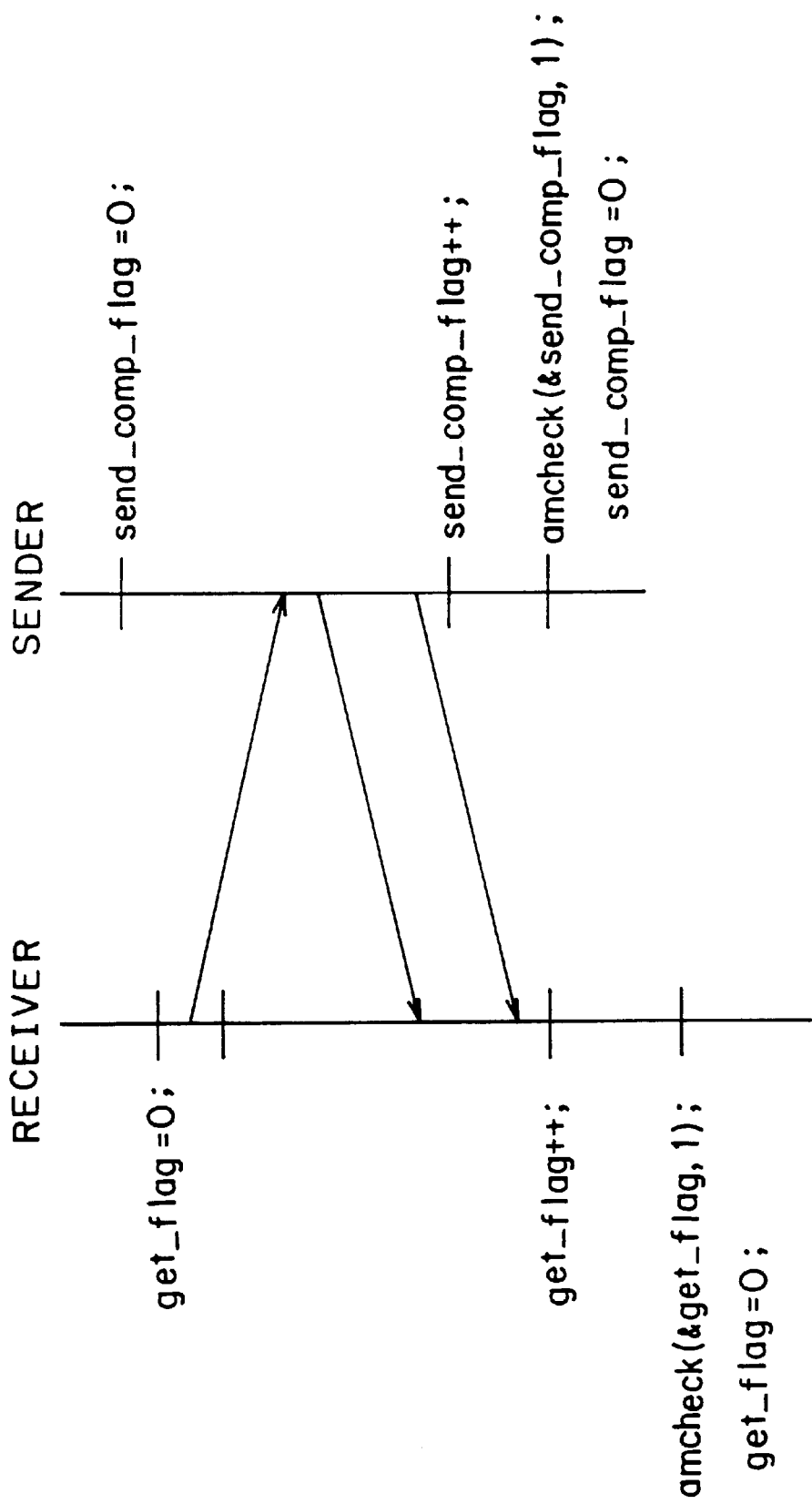
FIG. 7 is a time chart showing a process in issuing GET.

As shown in FIG. 7, when the receiver processing element 1 has received the required data designated by GET, the flag value of the get flag is changed to "1". When the function amcheck detects that the flag value is changed to "1", the software that has sent GET is notified of the completion of the required data reception.

Thus, according to the present invention, the software can be informed of the receive state of the requested data without using an interrupt. In the embodiment shown in FIG. 7, when the function amcheck detects that the flag value of the get flag is changed to "1", the software is notified of the completion of the required data reception.

However, when the flag value of the get flag is changed to a value other than "1", the software may be notified of the completion of the data reception.

When the receive control unit 24 of the processing element 1 receives GET, it queues the GET in the reply command queue 27. When the command process unit 28 sends data required by the queued GET, it directs the memory control unit 23 through the transmission control unit 29 to read data of the size designated by GET starting from the address remote_addr designated by GET from the memory 11 and directs the transmission control unit 29 to send the information with respect to the GET and the read data to the processing element 1 that sent GET.

When this process is started, the command process unit 28 sends the address of the send complete flag designated by GET to the memory control unit 23 through the transmission control unit 29 and directs it to update the send complete flag. The memory control unit 23 stores the address of the send complete flag in the flag address holding unit 25 in response to this request.

Thereafter, the memory control unit 23 reads the required data from the memory 11 and sends it to the transmission control unit 29. Thus, the required data is sent to the processing element 1 that sent GET. After the memory control unit 23 has completed the read process of the requested data, it informs the flag update unit 26 of the completion of the required data transmission.

When the flag update unit 26 is informed of the completion, it exclusively obtains the flag value stored at by the address of the send complete flag held in the flag address holding unit 25, that is the flag value of the send complete flag, and increments the flag value by "1".

As shown in FIG. 7, when the sender processing element 1 has sent required data designated by GET, the flag value of the send complete flag is changed to "1". When the function amcheck detects that the flag value is changed to "1", the software of the processing element 1 that received GET is notified of the completion of the required data transmission.

Thus, according to the present invention, the sending region of the memory can be protected without using an interrupt. In the embodiment shown in FIG. 7, when the function amcheck detects that the flag value of the send complete flag is changed to "1", the software is notified of the completion of the required data transmission. However, when the flag value is changed to a value other than "1", the software may be notified of the completion of the required data transmission.

Figure 8:
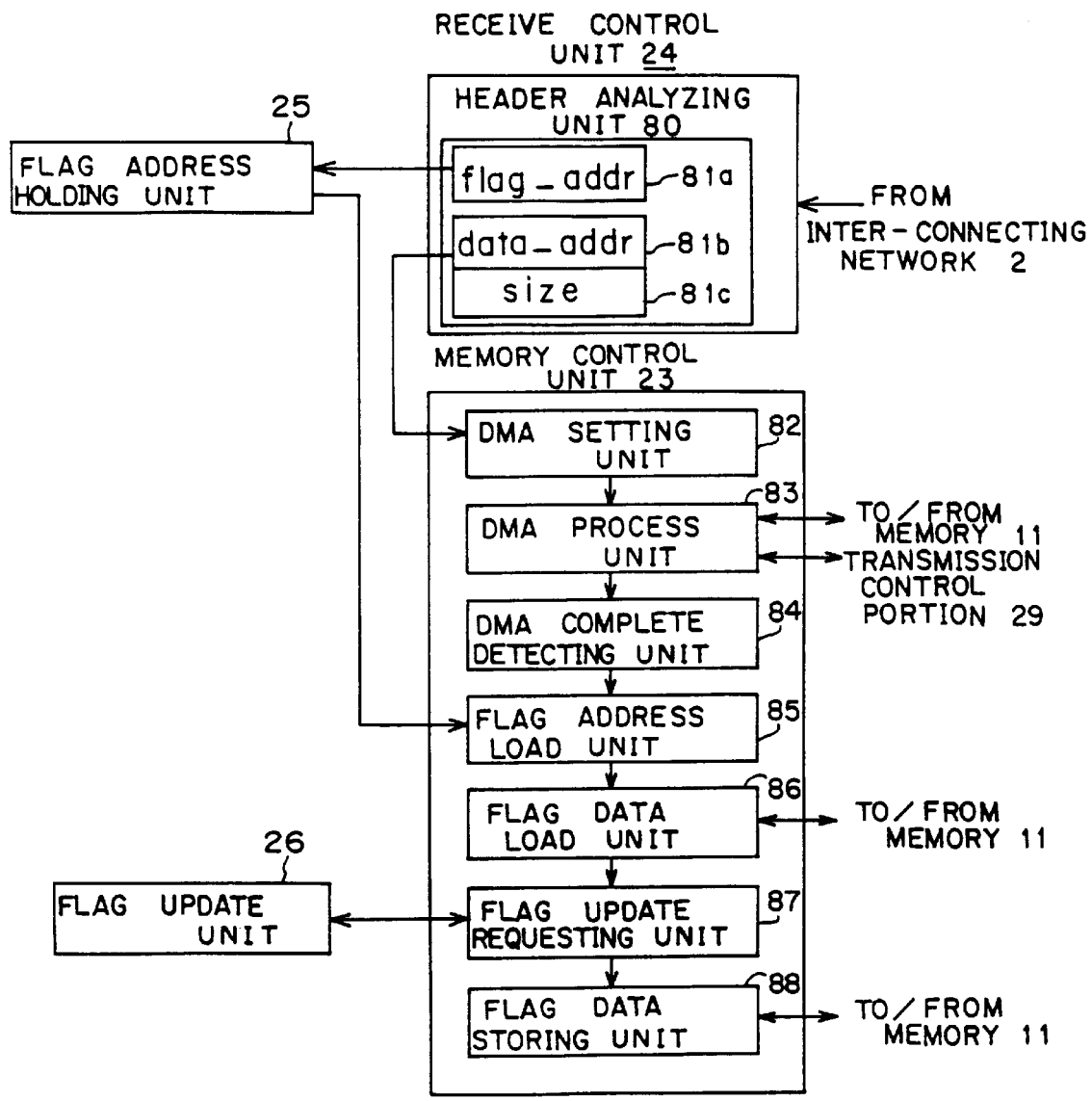
FIG. 8 is a schematic diagram for explaining a flag update process that is performed when a message is received.

FIG. 8 shows a flag update process that is performed when a message is received.

A header analyzing unit 80 in the receive control unit 24 analyzes a message received from the inter-connecting network 2 and extracts an address of a flag (flag_addr) 81a, the starting address of data to be sent (data_addr) 81b, and a size (size) 81c of the data to be sent. The extracted flag_addr 81a is output to the flag address holding unit 25 to be held in the flag address holding unit 25. The data_addr 81b and the size 81c are output to the memory control unit 23.

When a DMA setting unit 82 of the memory control unit 23 receives the data_addr 81b and size 81c from the receive control unit 24, it sets the DMA (Direct Memory Access) corresponding to these data and directs the DMA process unit 83 to activate DMA. The DMA process unit 83 performs the DMA process between the memory 11 and the transmission control unit 29 based on a command from the DMA setting unit 82. When a DMA complete detecting unit 84 detects the completion of the DMA process, it directs the flag address load unit 85 to load the address of the flag. The flag address load unit 85 reads the address of the flag from the flag address holding unit 25 in response a command from the DMA complete detecting unit 84. A flag data load unit 86 reads the value of the flag stored in the memory 11 corresponding to the address of the flag. A flag update requesting unit 87 sends the read data to the flag update unit 26 and directs the flag update unit 26 to update the flag. The flag data updated by the flag update unit 26 is sent back to the memory control unit 23. A flag data storing unit 88 writes, the flag data at the same flag address of the memory 11.

As described above, when the data transmission indicated by the received message has been completed, a flag that indicates the completion of the data transmission is updated.

In the above-described embodiment, when the address value of the flag included in the message is set to zero, the flag update process is not performed.

In the embodiment shown in FIG. 4, to raise the speed of the reply process, the reply command queue is provided independently. However, a common queue can be used for the reply command queue 27 and the transmission request command queue 20. In this case, the command process unit 28 and the transmission control unit 29 can be omitted and thereby the construction can be simplified.

Figure 9:
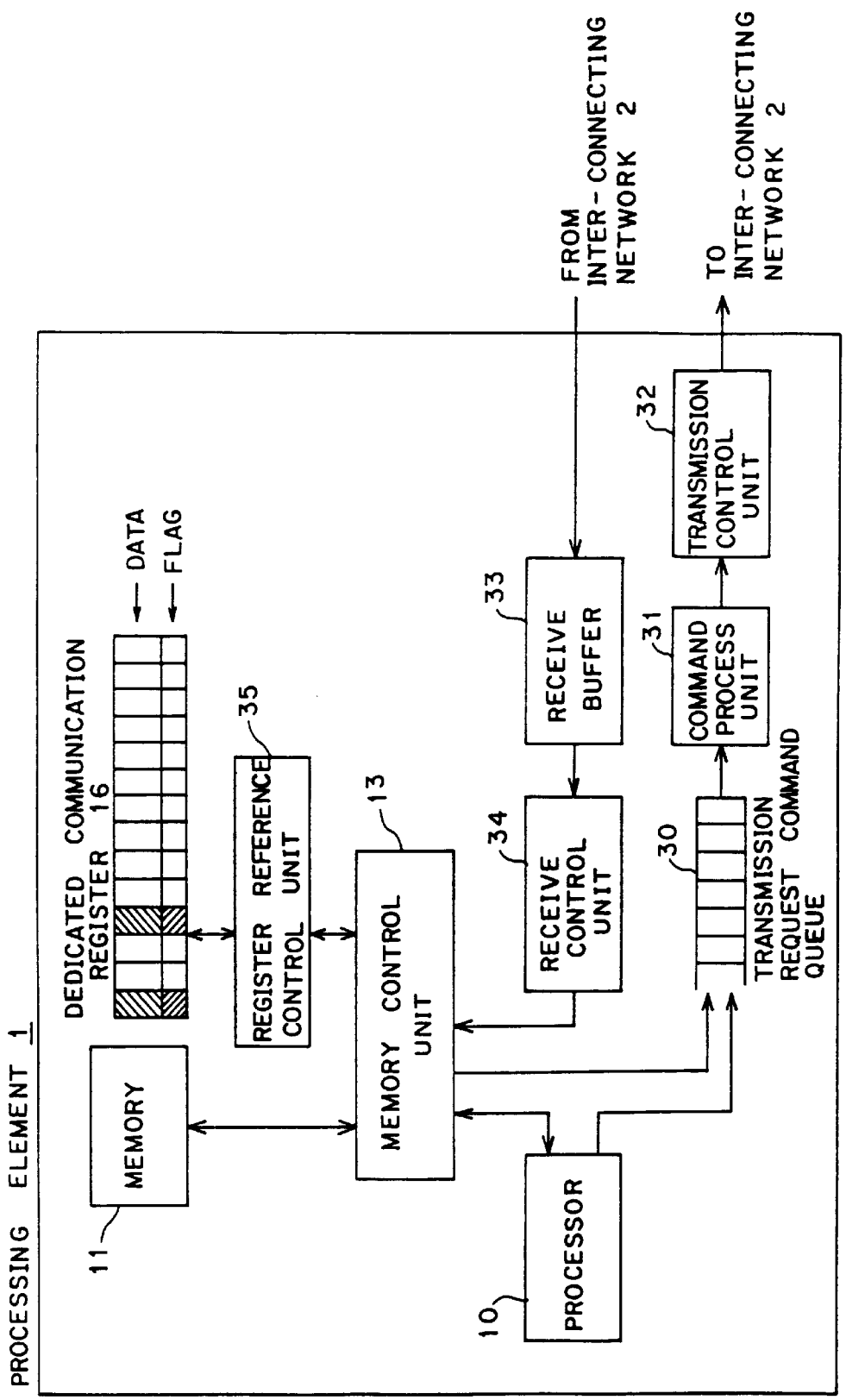
FIG. 9 is a block diagram showing an embodiment of the present invention.

FIG. 9 shows an embodiment of the processing element 1 of FIG. 2. Next, the construction of this embodiment will be described in detail. In FIG. 9, the same units as those in FIG. 2 are denoted by the same reference numerals.

In FIG. 9, a transmission request command queue 30 queues PUT and GET requested by the processor 10. A command process unit 31 interprets a transmission request queued in the transmission request command queue 30 and issues a data transmission request. A transmission control unit 32 that executes a data transmission process corresponding to a data transmission request issued by the command process unit 31.

A receive buffer 33 that temporarily stores data sent from another processing element 1. A receive control unit 34 that receives data from another processing element 1. A register reference control unit 35 that executes a reference process of data stored in the dedicated communication register 16.

In the processing element 1 according to the present invention configured as described above, when the processor 10 writes data to a predetermined address of a shared memory space, the memory control unit 13 generates packets and queues them in the transmission request command queue 30. The command process unit 31 successively sends the queued packets to another processing element 1 using PUT.

Thus, the processor 10 can send data to a desired processing element 1 with only a store command for a predetermined address. The data will be stored in the dedicated communication register 16 of a processing element 1 that is mapped to the predetermined address.

When the receive control unit 34 receives data sent from another processing element 1 with PUT or in response to GET, the memory control unit 13 writes the data to a designated register of the dedicated communication register 16. When the data has been written to the designated register, a flag corresponding to the register is set to "1" that represents that data is stored.

The processor 10 acquires data necessary for a particular operation from another processing element 1 by issuing a load command with a register number of the dedicated communication register 16 in which the data is stored. The load command is sent to the register reference control unit 35. When the bit value of the flag corresponding to the register number is "1", the register reference control unit 35 reads data from the register of the dedicated communication register corresponding to the register number and sends the data to the processor 10. When the bit value is "0", the register reference control unit 35 waits until the bit value becomes "1". When the bit value becomes "1", the register reference control unit 35 reads data and sends it to the processor 10. After the register reference control unit has read the data, the bit value is reset to "0".

Thus, the processor 10 can receive desired data with only one load command.

According to this embodiment, the dedicated communication register 16 which is nearer to the processor 10 than the memory 11 is provided. The dedicated communication register 16 is used as a destination of transmission by PUT to reduce the overhead for the memory access. In addition, since a flag that represents data storage stage of the register 16 is provided, the access of the register from the processor 10 can be controlled by hardware. When the flag of the dedicated communication register 16 represents that necessary data is not stored yet, it is preferable to process another task in ready state.

With the above configuration, the processor 10 can execute the global operation process, the broadcast process, and the barrier synchronizing process at high speed.

In other words, since the processor 10 performs an operation process for both data stored in the dedicated communication register 16 and local data and sends the calculated resultant data to the dedicated communication register 16 of another processing element 1 using PUT, the global operation process can be executed at high speed. In this case, for example, to inform another processing element 1 of the processing element 1 with the maximum value of the calculated resultant data an ID number of the processing element 1 may be sent to the dedicated communication register 16. In other words, in addition to the calculated resultant data, the ID number of the processing element 1 with particular calculated resultant data can be sent to the dedicated communication register 16.

In addition, when the processor 10 sends broadcast data to the dedicated communication register 16 of another processing element 1, the broadcast process can be executed at high speed.

The processor 10 also performs an operation for both data stored in the dedicated communication register 16 and local data and sends the calculated resultant data to the dedicated communication register 16 of another processing element 1 using PUT to execute the barrier synchronizing process at high speed. For example, when the processing element 1 comes to barrier synchronizing point, "1" is output to another processing element 1. When the sum of the output values reaches the number of processing elements 1, it is determined that the barrier synchronization has been established. Thus, the barrier synchronizing process can be executed at high speed.

In addition, the processor 10 performs a predetermined operation for data stored in the dedicated communication register 16 and sends the calculated resultant data to the dedicated communication register 16 of another processing element 1 using PUT to execute the recognizing process of the status of the barrier synchronization at high speed. For example, the processing element 1 sends a state value at the barrier synchronizing point to another processing element 1 or performs AND operation and OR operation for the status value to detect the status value at the barrier synchronizing point. Thus, the recognizing process of the status of the barrier synchronization can be executed at high speed.

Figure 10:
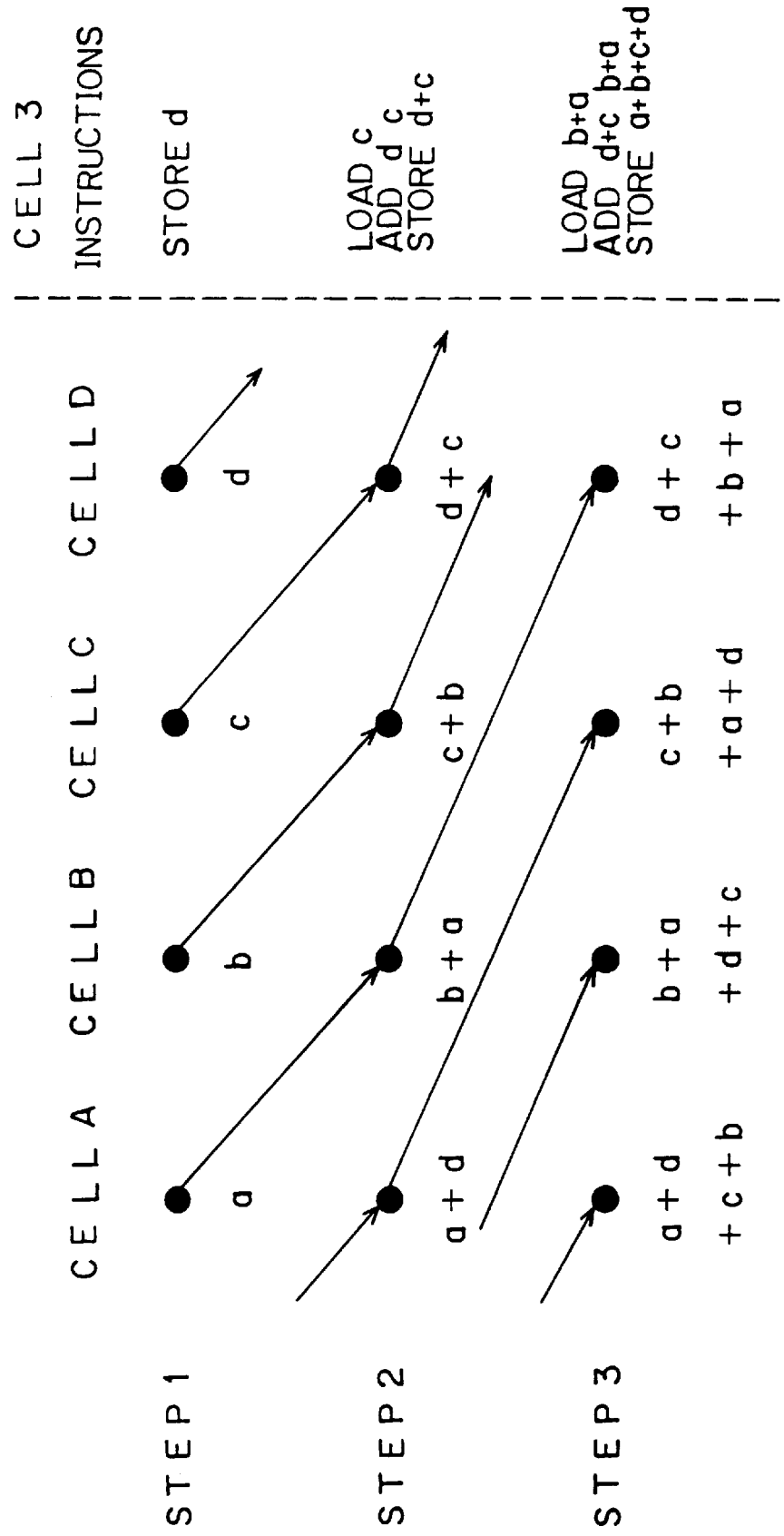
FIG. 10 is a schematic diagram showing an execution example of a global operation.

Next, with reference to FIG. 10, an example of the global operation executed by an embodiment of the present invention will be described. In this example, a global operation that calculates the sum of local data of four processing elements is considered.

To calculate the sum of the local data, at step 1, the processing element 1 of a cell A sends local data a to the dedicated communication register 16 of the processing element 1 of a cell B that is adjacent to the cell A. The processing element 1 of the cell B sends local data b to the dedicated communication register 16 of the processing element 1 of a cell C that is adjacent to the cell B. The processing element 1 of the cell C sends local data c to the dedicated communication register 16 of the processing element 1 of a cell D that is adjacent to the cell C. The processing element 1 of the cell D sends local data d to the processing element 1 of the cell A that is adjacent to the cell D.

At step 2, the processing element 1 of the cell A calculates the sum of the local data a and the data d stored in the dedicated communication register 16 and sends the added value to the dedicated communication register 16 of the processing element 1 of the cell C that is away from the cell A by two cells according to crossover method. The processing element 1 of the cell B calculates the sum of the local data b and data a stored in the dedicated communication register 16 and sends the sum to the dedicated communication register 16 of the processing element 1 of the cell D that is away from the cell B by two cells according to the crossover method. The processing element 1 of the cell C calculates the sum of the local data c and data b stored in the dedicated communication register 16 and sends the sum to the dedicated communication register 16 of the processing element 1 of the cell A that is away from the cell C by two cells according to the crossover method. The processing element 1 of the cell D calculates the sum of the local data d and data c stored in the dedicated communication register 16 and sends the sum to the dedicated communication register 16 of the processing element 1 of the cell B that is away from the cell D by two cells according to the crossover method.

At step 3, the processing element 1 of the cell A calculates the sum of two stored data (a+d) and (c+b) of the dedicated communication register 16. The processing element 1 of the cell B calculates the sum of two stored data (b+a) and (d+c) of the dedicated communication register 16. The processing element 1 of the cell C calculates the sum of two stored data (c+b) and (a+d). The processing element 1 of the cell D calculates the sum of stored data (d+c) and (b+a) of the dedicated communication register 16.

Thus, the global operation that calculates the sum of local data is executed. In such a global operation, when the number of processing elements 1 is $2^n$, each of load, store and operation is executed n times. In addition, data are sent according to the crossover method in such a manner that the first data is sent to the adjacent processing element 1, the next data is sent to a processing element 1 that is away from the processing element 1 by two processing elements, the third data is sent to a processing element 1 that is away from the processing element 1 by four processing elements, and so forth. Thus, when the number of processing elements 1 is $2^n$, the dedicated communication register 16 of each processing element 1 should have n registers.

As described above, according to the present invention, when a message such as PUT/GET that directly accesses a memory and does not have an explicit receive command is used, since a flag used to protect send/receive regions necessary for sending and receiving a message is updated by hardware, the operation of the processor is not affected by an interrupt. When requests of PUT/GET are sent without blocking the procession, communication and calculation can be completely overlapped, thereby remarkably improving executing efficiency of the parallel computer.

When a message such as PUT that directly accesses the memory is used, since a dedicated communication register to which data indicated by the message is sent is used, the overhead for accessing the memory can be remarkably reduced. In addition, since data storage state of the dedicated communication register is represented with a flag, the access of the processor to the dedicated communication register can be controlled by hardware. Since the overhead of the software is reduced, a processing element can execute the global operation process, the broadcast process, and the barrier synchronizing process at higher speed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A parallel computer including a plurality of processing elements, each of the processing elements comprising:

processor means for executing instructions and processing data; and communication control means constructed of hardware, comprising:

flag address holding means for temporarily holding an address of a send complete flag of a direct remote write message when the direct remote write message is sent to one of the plurality of processing elements; and flag update means exclusively updating a flag indicated by the address held in said flag address holding means when transmission of data indicated by the direct remote write message is completed independently from execution and processing of said processor means.

2. The parallel computer as set forth in claim 1, wherein said flag update means updates said flag indicated by the address held in said flag address holding means a predetermined number of times to represent a completion of the transmission.

3. The parallel computer as set forth in claim 1,
wherein said flag address holding means further holds an address of an acknowledgement flag that represents that the direct remote write message has been received; and
wherein said flag update means updates the acknowledgement flag indicated by the address thereof held in said flag address holding means when the direct remote write message is sent and updates the acknowledgement flag indicated by the address thereof held in said flag address holding means in an inverse mode when a receive complete message is received from one of the plurality of processing elements in response to the direct remote write message.

4. A parallel computer including a plurality of processing elements, each of processing elements comprising:
processor means for executing instructions and processing data; and
communication control means constructed of hardware, comprising:
flag address holding means for temporarily holding an address of a receive complete flag of a direct remote write message when the direct remote write message is received from one of the plurality of processing elements; and
flag update means for exclusively updating a flag indicated by the address held in said flag address holding means when reception of data indicated by the direct remote write message has been completed independently from execution and processing of said processor means.

5. The parallel computer as set forth in claim 4, wherein said flag update means updates said flag a predetermined number of times to represent a completion of the reception.

6. A parallel computer including a plurality of processing elements, each of processing elements comprising:
processor means for executing instructions and processing data; and
communication control means constructed of hardware, comprising:
flag update means for exclusively updating a flag indicated by an address of an acquisition complete flag of a direct remote read message when reply data indicated by the direct remote read message has been received from one of the plurality of processing elements independently from execution and processing of said processor means,
wherein the flag is updated a predetermined number of times to represent that the reply data has been received.

7. A parallel computer including a plurality of processing elements, each of processing elements comprising:
processing means for executing instructions and processing data; and
communication control means constructed of hardware, comprising:
flag address holding means for temporarily holding an address of a reply complete flag of a direct remote read message when the direct remote read message is read from one of the plurality of processing elements; and flag update means for exclusively updating a flag indicated by an address held in said flag address holding means when data of the direct remote read message has ben sent independently from execution and processing of said processor means.

8. The parallel computer as set forth in claim 7, wherein said flag update means updates said flag a predetermined number of times to represent data of said message has been sent.

9. A parallel computer including a plurality of processing elements, each of the processing elements comprising:
a dedicated communication register having a plurality of registers and a plurality of flags corresponding to each of the plurality of registers, said registers storing data indicated by a direct remote write message received from one of the plurality of processing elements, the flags managing bit values of data storage states of corresponding registers,
wherein data stored in said dedicated communication register is used to reference data of one of the plurality of processing elements.

10. The parallel computer as set forth in claim 9, wherein the processing element executes a task that is in ready state when a flag of said dedicated communication register represents that required data is not stored.

11. The parallel computer as set forth in claim 9, wherein a processing element performs an operation for both data stored in said dedicated communication register and local data and sends calculated resultant data to said dedicated communication register of one of the plurality of processing elements with the direct remote write message so as to execute a global operation.

12. The parallel computer as set forth in claim 11, wherein the processing element which participates in the global operation process further sends ID information of a processing element that holds particular calculated result data.

13. The parallel computer as set forth in claim 11, wherein the processing element which participates in the global operation process determines a processing element to which the calculated resultant data is sent according to a crossover method.

14. The parallel computer as set forth in claim 13, wherein said dedicated communication register of the processing element which participates in the global operation process has $\log_2 n$ registers where the number of processing elements which participate in the global operation process is n.

15. The parallel computer as set forth in claim 9, wherein a processing element sends broadcast data to said dedicated communication register of one of the plurality of processing elements using a direct remote write message so as to execute a broadcast process.

16. The parallel computer as set forth in claim 9, wherein a processing element performs an operation for both data stored in said dedicated communication register and local data and sends calculated resultant data to said dedicated communication register of one of the plurality of processing elements using a direct remote write message so as to execute a barrier synchronizing process.

17. The parallel computer as set forth in claim 9, wherein a processing element performs a predetermined operation for data stored in said dedicated communication register and sends calculated resultant data to said dedicated communication register of one of the plurality of processing elements using a direct remote write message so as to execute a recognizing process of status of barrier synchronization.

18. A parallel computer including a plurality of processing elements, comprising:

a first processing element having a first dedicated communication means, constructed of hardware, wherein said first dedicated communication means has a plurality of registers and a plurality of flags corresponding to each of the plurality of registers, said registers store data received from second processing elements, the flags manage bit values of data storage states of corresponding registers, and data stored in the first dedicated communication means is used to reference data of the second processing elements; and said second processing elements, each having second dedicated communication means, constructed of hardware, to transmit the flags to said first processing element.

* * * * *